United States Patent [19]

Wasserman

[11] 4,248,209
[45] Feb. 3, 1981

[54] COUPLED TOROIDAL SOLAR COLLECTOR

[76] Inventor: Kurt J. Wasserman, P.O. Box 77, Port Jervis, N.Y. 12771

[21] Appl. No.: 130,547

[22] Filed: Mar. 14, 1980

[51] Int. Cl.³ .............................. F24J 3/02; F28F 9/26
[52] U.S. Cl. .................................... 126/417; 126/400; 126/435; 126/436; 126/449; 126/450; 165/143; 165/157; 165/164
[58] Field of Search ............... 126/417, 450, 429, 436, 126/449, 901, 442, 430, 443; 165/143, 157, 166, 164

[56] References Cited

U.S. PATENT DOCUMENTS

| | | | |
|---|---|---|---|
| 3,997,108 | 12/1976 | Mason | 126/429 |
| 4,088,266 | 5/1978 | Keyes | 126/429 |
| 4,100,914 | 7/1978 | Williams | 126/429 |
| 4,160,443 | 7/1979 | Brindle et al. | 126/430 |
| 4,162,671 | 7/1979 | Christy | 126/400 |
| 4,166,445 | 9/1979 | McGraw | 126/432 |

Primary Examiner—James C. Yeung
Assistant Examiner—Daniel O'Connor
Attorney, Agent, or Firm—Jack D. Slobod

[57] ABSTRACT

A solar collector is formed by a stack of vehicular tires for absorbing solar radiant energy. A series of conduits intercepting the upper and lower sidewall of each tire at locations spaced about 180 degrees apart couple together the hollow interiors of the tires in an air path passing angularly through each tire in two paths of about 180 degrees in length and serially from tire to tire for heat exchange purposes. A thermal energy storage medium is provided in the center of the stack which medium may be porous and switchable dampers are provided to selectively set up either a recirculating air path through the tires and the medium to transfer heat from the tires to the medium or a recirculating air path between the medium and a living space to be heated.

11 Claims, 4 Drawing Figures

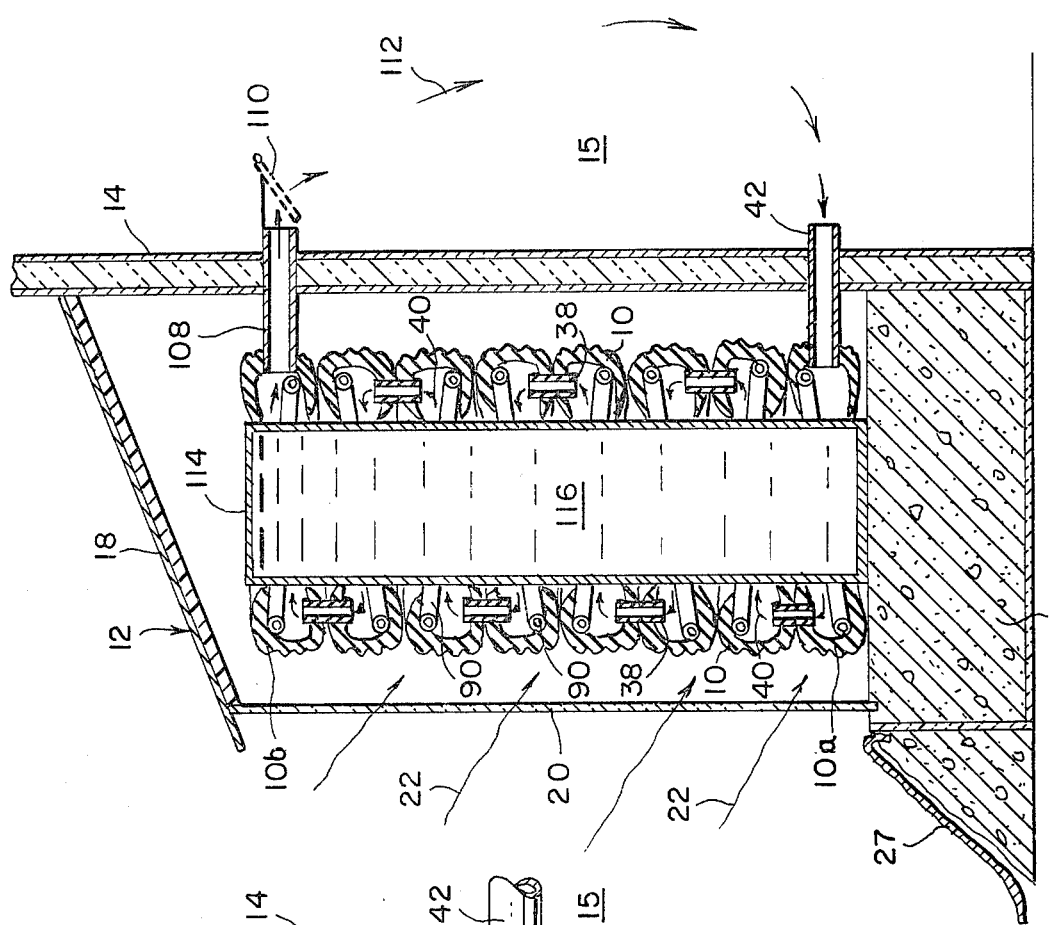
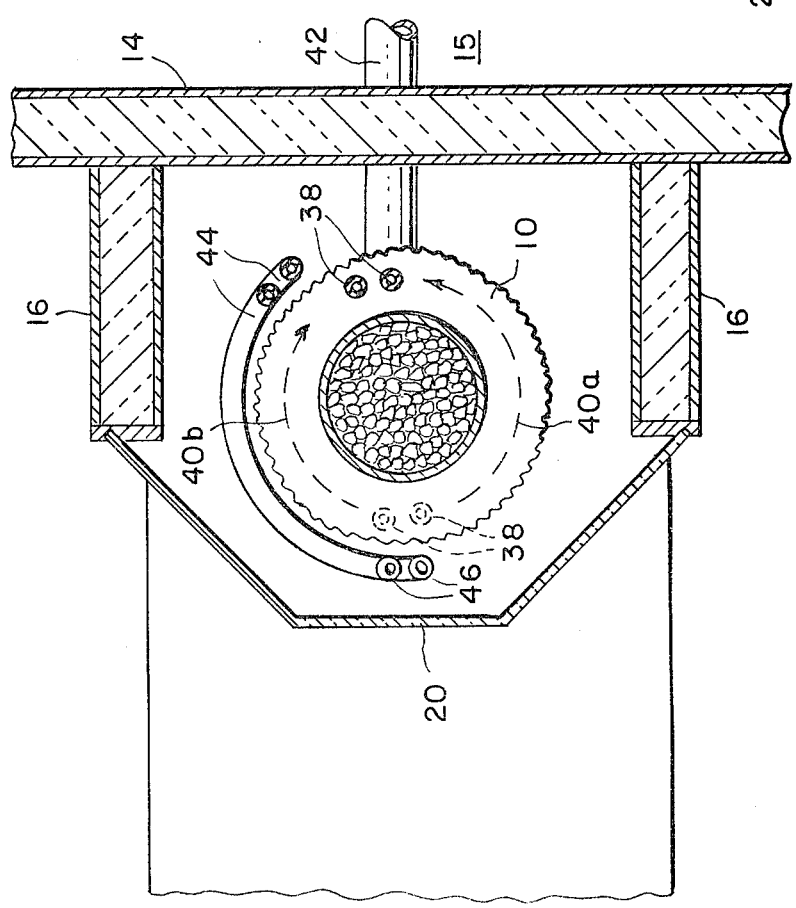

COUPLED TOROIDAL SOLAR COLLECTOR

FIELD OF THE INVENTION

The present invention relates generally to a solar collector utilizing a stack of generally toroidal, hollow, substantially black, elastomeric, vehicular tire-like members for absorbing and being heated by solar radiant energy. In its particular aspects the present invention relates to the provision in such a solar collector of conduit means coupling together the hollow interiors of said members along a fluid path passing angularly and serially through the interiors of said members.

BACKGROUND OF THE INVENTION

In my co-pending patent application, Ser. No. 36,874, filed May 7, 1979, I have disclosed the use of stacked vehicular tires as generally toroidal heat collection elements of a solar heating system which included a thermal energy storage medium such as a rock bed or water tank in the center of the stack. I have found that there is a need to provide a mechanism for more efficient heat transfer between the tires and either the thermal energy storage medium or a living space to be heated. I have discovered that by coupling together these generally toroidal elements with suitably located conduits, it is possible to define an air or fluid path in heat exchange relationship with these elements which passes angularly through the hollow interior of each element and serially through these elements. It is then possible to set up a recirculating air or fluid path including this path through the interiors of the toroidal elements for transferring the solar radiant energy absorbed by these elements to either the thermal energy storage medium at the center of the stack or to a living space to be heated.

OBJECTS OF THE INVENTION

It is an object of the present invention to provide a solar collection apparatus formed by a stack of generally toroidal, hollow, substantially black, elastomeric, vehicular tire-like members with conduit means coupling together the hollow interiors of the members of the stack along an air or fluid path passing angularly and serially through the interiors of said members.

It is further object of the present invention to provide a stacked tire solar collector which includes a thermal energy storage medium in the center of the stack in which a recirculating air or fluid path is set up between the members of the stack and the medium for transferring heat from the stack to the medium.

It is yet another object of the present invention to provide a stacked tire solar collector with a thermal energy storage medium at the center of the stack in conjunction with switchable damper means for setting up either a recirculating air or fluid path between the interiors of the tires and medium or between the medium and a living space to be heated.

It is still another object of the present invention to provide a stacked tire solar collector, having a thermal energy storage medium at the center of the stack with conduit means coupling together the tires and the medium in a manner that a recirculating air or fluid path is set up serially through the interiors of the tires, through the medium and along the exteriors of the tires.

SUMMARY OF THE INVENTION

The aforementioned and other objects of the present invention are satisfied by providing a vertical stack of generally toroidal, hollow, substantially black, elastomeric, vehicular tire-like members for absorbing and being thereby heated by solar radiant energy. Conduit means are provided intercepting the members of the stack at angularly spaced apart locations for serially coupling together the hollow interiors of the members along a first air or fluid path passing angularly and serially through the interiors of the members. Each member is intercepted at two locations which are about 180 degrees apart to set up two angular paths through each member, each path being about 180 degrees in extent. At one of the two locations each member is coupled to the member above and at the other location to the member below. The upper and lower portions of the conduit means intercepting the stack are at the extremes of the first air or fluid path.

By utilizing a porous energy storage medium, or a medium having an air channel through it, and by utilizing a properly located fan or impeller means, a recirculating air or fluid path may be set up through the first path and through the energy storage medium for transferring heat from the members of the stack to the medium. Furthermore, by utilizing switchable damper means in conjunction with the medium and the impeller means, recirculating paths can be set up selectively either including the first path and the path through the energy storage medium, or including the path through the energy storage medium and the path through the living space to be heated.

A further advantage is gained by providing an elongated downwardly directed conduit which directs air emanating from the topmost member to a point proximate the bottom of the stack so that air rises along and in contact with the exteriors of the members for further heat exchange before being directed into the energy storage medium.

The aforementioned and other objects, features and advantages of the present invention will become apparent upon perusal of the following detailed description of the preferred embodiments of the invention when taken in conjunction with the appended drawing.

BRIEF DESCRIPTION OF THE DRAWING

FIG. 3 is a downwardly looking cross-sectional view of the first embodiment, taken through the lines 3—3 in FIG. 1; and FIG. 4 is a cross-sectional side elevational view of a second embodiment of the stacked-tire solar collector apparatus of the present invention.

DETAILED DESCRIPTION OF THE PREFERRED EMBODIMENTS

Figure 1:
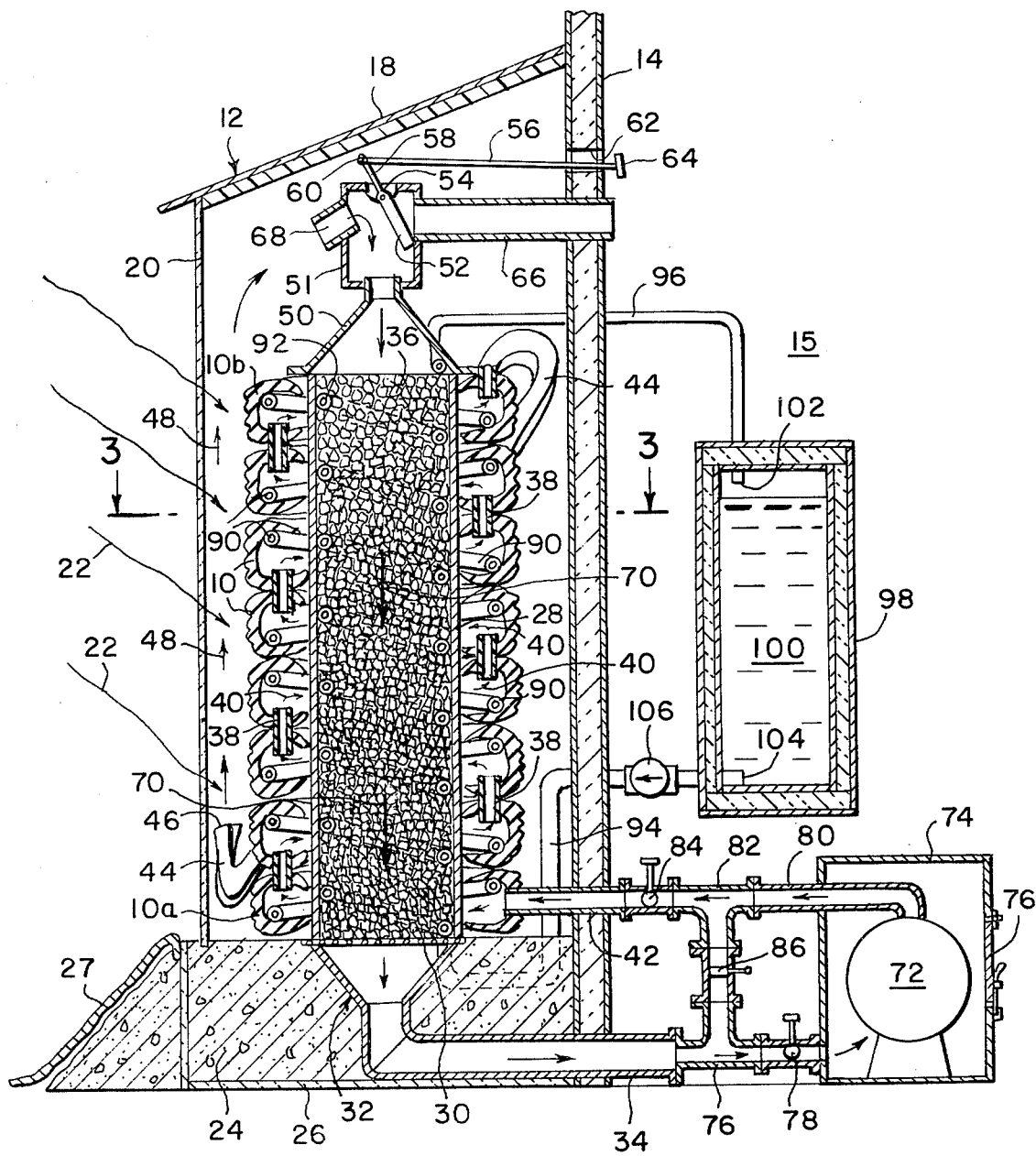
FIG. 1 is a cross-sectional side elevational view of a first embodiment of the stacked-tire solar collector of the present invention with its associated parts positioned for absorbing solar radiant energy and transferring this energy to the center of the stack.
Figure 2:
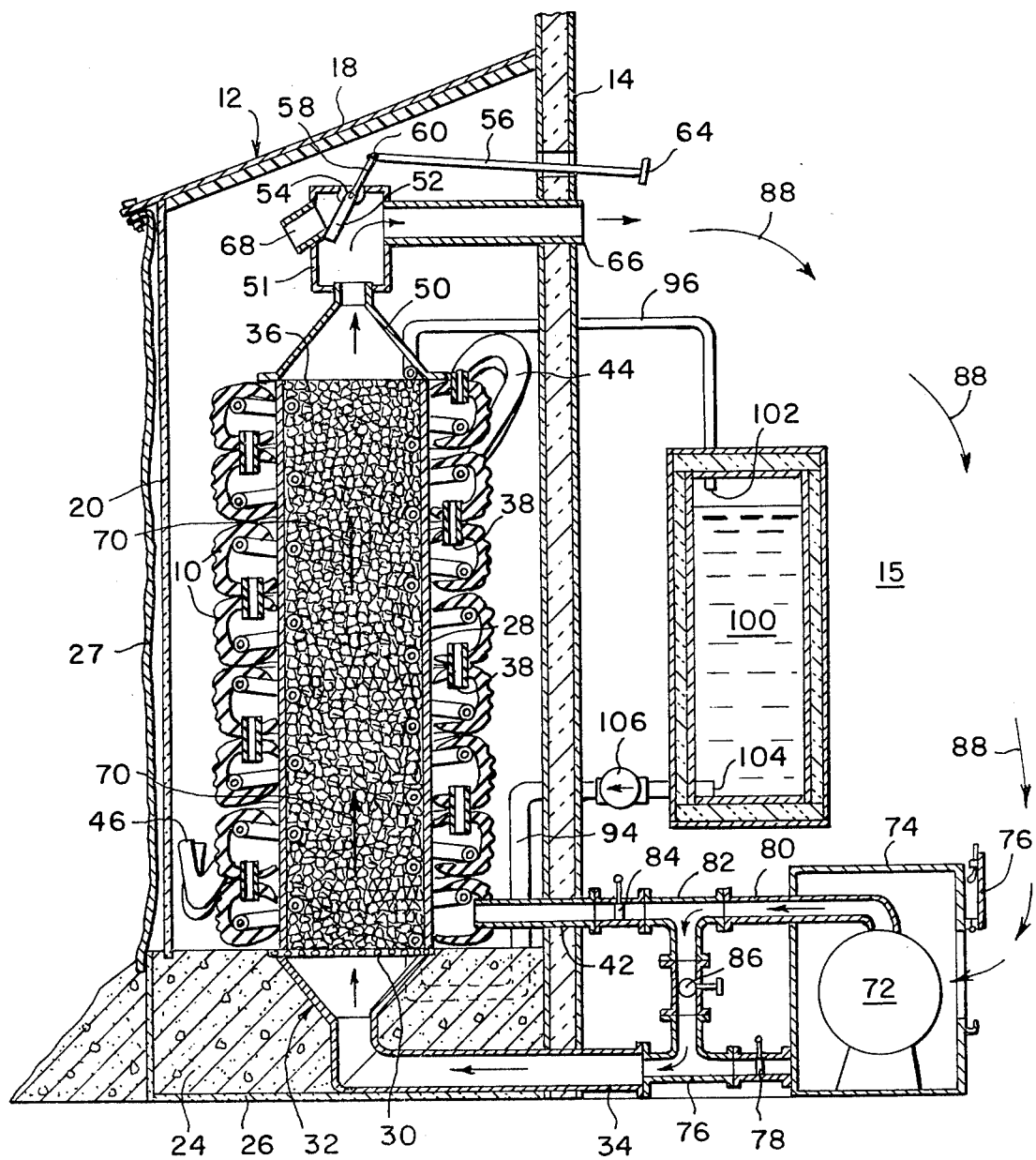
FIG. 2 is a cross-sectional side elevational view of the first embodiment of the stacked-tire solar collector of FIG. 1 but with its parts positioned for transferring heat from the center of the stack to a living space proximate the collector.

Referring to FIGS. 1 through 3, the first embodiment of the stacked-tire solar collector apparatus of the present invention comprises a vertical stack of generally toroidal, hollow, substantially black, elastomeric members which are preferable used vehicular tires 10 because of their inexpensive availability and good solar energy absorption characteristics. The stack of tires 10, is provided within an enclosure 12 which is conveniently built against the thermally insulated southern wall 14 (in northern hemispheres) of a building or living space 15 to which heat is to be supplied. Wall 14 forms the rear wall of enclosure 12. In addition, the enclosure has thermally insulated sidewalls 16, a thermally insulated roof 18 and a southerly facing translucent window 20 through which solar radiant energy 22 enters the enclosure and strikes the tires 10 thereby heating them. Enclosure 12 is built upon a foundation 24 as of concrete, which is thermally insulated from the ground by slabs of insulating material 26, such as foamed polystyrene. Also provided is an opaque and preferably reflecting curtain 27 which may be selectively positioned to uncover window 20 as in FIG. 1 for daytime, or cover window 20 as in FIG. 2 for evening. In the evening, curtain 27 reduces heat leakage from the stacked tires 10, through window 20. Thermal insulation, such as aluminum jacketed fiberglass sheets (not shown) may be provided within enclosure 12, against wall 14 to reflect radiant energy onto the stack of tires 10.

Each of the tires 10 is fitted sealably about an upright cylindrical metal collar 28 which rests upon a rigid grating or mesh 30 carried by foundation 24. At the time foundation 24 is poured, an upwardly opening funnel-shaped duct 32 is provided in the foundation positioned under the grating 20. Duct 32 includes a cylindrical output portion 34 which is directed through the base of wall 14. Thus, duct 32 receives any downwardly directed air flow through the center of collar 28 and directs that air flow through output portion 34. The center of collar 28 is filled with a column of rocks 36 as a thermal energy storage medium. Rocks 36 are packed loosely in order that vertical air flow through the column can take place.

Preferably, flexible conduits 38, such as vacuum cleaner hose of about 1½ inches in diameter, are passed vertically through holes in the sidewalls of tires 10 for serially coupling together the hollow interiors of the tires 10. Each tire is coupled to the tire above at one location and to the tire below at another location approximately 180 degrees spaced apart. This is best understood from an examination of FIG. 3 of the drawing where at the upper sidewall of tire 10 a pair of side by side conduits is utilized for adequate air carrying capacity to couple to the tire above and at a location 180 degrees removed, another pair of side by side conduits 38, (shown in hidden line) are used to couple tire 10 to the tire below. As a result, two angular air paths 40a, 40b are created through the interior of each tire 10 directed from the intersection of conduits 38 with the lower sidewall of each tire to the intersection of conduits 38 with the upper sidewall of each tire. Each of paths 40a, 40b is about 180 degrees in extent. As a consequence of the provision of conduits 38 coupling together the interiors of tires 10, there exists a first air path 40 which starts at the bottom tire 10a and passes angularly through each tire along paths 40a, 40b and serially from each tire to the tire above. Air path 40 is in heat exchange relationship with the walls of tires 10.

A conduit or pipe 42 passes radially through a hole in the tread of bottom tire 10a to provide the start of air path 40. Conduit 42 also passes through wall 14. A pair of elongated, flexible conduits 44, of the same characteristics as conduit 38, pass through the upper sidewall of the top tire 10b to define the end of path 40. Conduits 44 are directed downward to a point proximate the base of the stack of tires 10 and in front of window 20, with open ends 46 of conduits 44 being upwardly directed. This enables air from air path 40 after passing through the interior of tires 10 and out top tire 10b, to rise along path 48 which is directed along the exterior of tires 10 between the stack of tires and the window 20. The rising air along path 48 picks up further heat from tires 10.

At the top of collar 23 is provided a downwardly opening funnel-shaped duct 50 which is coupled to a rectangular shaped element 51 in which a planar damper 52 is pivotally mounted at 54. The movement of damper 52 is controlled by a rod 56 which is pivotally mounted to a rod-like extension 58 of damper 52 at 60. Rod 56 passes freely through a hole 62 in wall 14 and terminates with a handle 64. When handle 64 is pushed to a position as shown in FIG. 1, damper 52 is positioned to cover the opening of a duct 66 which passes from element 51 through wall 14 and to uncover an opening 68 in element 51 which faces window 20. In this position, air entering bottom tire 10a through duct 42, passes serially through tires 10 along path 40, out conduits 44, and upwardly from open ends 46, along path 48, through opening 68 into elements 51, downwardly through funnel-shaped duct 50 and through a downward air path 70 through the column of rocks 36, through funnel-shaped duct 32 and through output portion 34.

The aforementioned air path including paths 40, 48 and 70 is maintained in a recirculating air path by means of a centrifugal fan 72 or other suitable fan means, located within the building defined by wall 14. Fan 72 is located in an airtight box 74, having a door 76 which may be opened. Output portion 34 is coupled to the interior of box 74 via a tee 76, and a damper element 78. Similarly, the duct 42 is coupled to the output port 80 of fan 72 by means of a tee 82 and a damper element 84. The other branches of tees 76 and 82 are connected together by means of a damper element 86. As shown in FIG. 1, with the damper elements 78 and 84 in an open state, the damper element 86 and door 76 in a closed state, the air emanating from output portion 34, passes through fan 72 and is driven out duct 42 to maintain air recirculation to transfer heat from tires 10 to the thermal energy storage medium comprising the column of rocks 36.

When, as in the evening, it is desired to exchange heat from the rocks 36 to the interior 15 of the building defined by wall 14, as shown in FIG. 2, along an air path 88 in the building directed from duct 66 to the box 74, then handle 64 is pulled to reposition damper 52 to uncover the opening to duct 66 and to cover the opening 68. Also, the dampers 78 and 84 are closed and the damper 86 and door 76 are opened. This action sets up an air flow from fan output 80, to tee 82 to tee 76 and out portion 34. This air flow continues upward through funnel-shaped duct 32 and up through the rocks 36, along path 70, through funnel-shaped duct 50, and element 51 into duct 66, along path 88 within living space 15 and through open door 76 into the box 74 to fan 72.

Additional heat storage capacity may be provided utilizing the hollow interiors of tires 10 by filling a plurality of elongated, flexible thin-walled plastic or elastomeric tubes 90, of about 1 inch in diameter and about four feet in length, with a phase change material preferably having a heat of fusion in excess of 50 BTU per pound and a melting point ranging between 75 and 120 degrees Fahrenheit, and thereafter sealing the ends of each tube. The plastic utilized such as polyolefin should include about 35% by weight of carbon black, metallic oxide, or metal flakes to render the wall of tube 90 thermally conductive. A separate one of tubes 90 is laid angularly directed within the toroidal hollow of each tire 10. Suitable phase change materials generally consist of salt hydrates, such as sodium sulfate decahydrate, or their eutectics. Suitable compositions therefore including nucleating and homogenizing agents are detailed in U.S. Pat. No. 3,986,969 to Maria Telkes granted Oct. 19, 1976. Other phase change materials such as waxes are known but not generally preferred because of flammability. Further, other configurations of holders for the phase change material, which are adaptable to the hollow toroidal interiors of tires 10 and which are configured so as not to unduly obstruct the air path 40 may be used. It will be appreciated that as the tires 10 are heated, this heat is transferred by conduction and convection, to and stored in the phase change material filled tubes 90 and the air flow along 40 extracts this heat along with heat from the walls of tires 10.

The solar collector of the present invention may also be used for heating water by providing an elongated rigid pipe 92 as of copper, coiled in a vertically directed helix within the bed of rocks 36. Pipes 94, 96, coupled to opposite ends of pipe 92, pass through wall 14 and are directed to a thermally insulated tank 98 for the water 100 being heated. Pipe 96 is directed to an inlet 102 at the top of tank 98 and pipe 94 is directed to the outlet 104 of the tank 98 and an electric pump 106 in series with pipe 94 continually recirculates the water 100 between the helical pipe 92 and the tank 98 whereby the water is heated by the rocks 36.

The stacked tire solar collector of the present invention, when being heated by incident solar radiant energy, produces a thermal gradient vertically along the stack which tends to drive air generally upward along path 40. This effect is taken advantage of in a simplified embodiment of the stacked tire solar collector of the present invention as illustrated in FIG. 4 of the drawing. Therein, the stack of tires 10 is provided in a similar enclosure 12. The tires 10 are coupled in the manner previously described by conduits 38 to provide the air path 40 passing angularly and serially through the interiors of the tires. However, the duct 42 which is directed radially through the tread portion of bottom tire 10a, forms a port for receiving air from the building or living space 15 defined by wall 14. Additionally, a duct 108 passes radially through tread portion of top tire 10b and passes through wall 14. Duct 108 terminates within the building with an adjustable register 110 for selectively closing off duct 108. When the register 110 is open, heated rising air along path 40 through the interiors of tires 10, exits duct 108 at register 110 and flows downward along a path 112 within the living space 15 to duct 42 where it returns to the bottom tire 10a. Thus, a continuous air circulation is produced along the paths 40 and 112 which transfers heat from the tires 10 to the living space 15.

In this embodiment, the stack of tires 10 is preferably fitted sealably about a vertically directed sealed cylindrical metal tank 114 containing water 116 for thermal energy storage. The tubes 90 containing phase change material are also conveniently utilized within the interiors of tires 10.

It should be appreciated that the preferred embodiments of the present invention have been described in particular detail. However, numerous modifications, additions and omissions in these details are possible within the intended spirit and scope of the invention. For example, in the embodiment of FIGS. 1 through 3 of the drawing, the collar 28 and column of rocks 36 might be replaced with an annular water tank which in turn might be coupled to pipes 94, 96. Furthermore, a liquid might be utilized instead of air as a heat transfer medium in the "air" paths previously referred to. Hence, the term "fluid" is intended to encompass both liquid and gaseous heat transfer media.

What is claimed is:

1. A solar collector apparatus comprising:
   a vertical stack of coaxially aligned generally toroidal hollow, substantially, elastomeric, vehicular tire-like members for absorbing and being thereby heated by solar radiant energy;
   conduit means intercepting the members of said stack at angularly spaced apart locations, said conduit means being directed for serially coupling together the hollow interiors of the members of said stack, said conduit means defining a first fluid path passing angularly and serially through the hollow interiors of the members of said stack in heat exchange relationship with the interiors of said members; top and bottom portions of said conduit means being at opposite extremes of said first fluid path, said conduit means intercepting each member at two said locations which are angularly spaced apart about 180 degrees, whereby said first fluid path includes two angular fluid paths through the hollow interior of each member, each of said two angular fluid paths being about 180 degrees in extent;
   a heat storage medium in the center of said stack, said heat storage medium being configured to define a second fluid path through the center of said stack in heat exchange relationship with said medium;
   fluid path defining means respectively coupling the bottom and top ends of said medium to said bottom and top conduit means portions to define a first recirculating fluid path including the first and second fluid paths; and
   impeller means in series with said fluid path defining means for driving fluid through said first recirculating fluid path, whereby heat from said members is transferred to said medium.

2. The apparatus of claim 1, further comprising a third fluid path through a space, proximate said members, to be heated and wherein said fluid path defining means includes switchable means for selectively either placing said impeller means in series with said first recirculating fluid path or for placing said impeller means in series with a second recirculating fluid path which includes said second and third fluid paths.

3. The apparatus of claim 1, wherein said fluid path defining means defines said first recirculating fluid path in a manner that over a portion of said first recirculating fluid path, fluid flows generally vertically along and in contact with the exterior of said stack for additional heat exchange.

4. The apparatus of claim 1, further comprising recirculating liquid heat exchange means in heat exchange relationship with said medium and with a space, external of said stack, to be heated.

5. The apparatus of claim 1, further comprising a thermal energy storage medium within the hollow interior of each member of said stack, said medium being configured and contained so as to enable fluid flow along said first fluid path angularly through the hollow interiors of said members.

6. A solar collector apparatus comprising:
  a vertical stack of generally toroidal, hollow, substantially, elastomeric, vehicular tire-like members for absorbing and being thereby heated by solar radiant energy; and
  conduit means intercepting the members of said stack at angularly spaced apart locations, said conduit means being directed for serially coupling together the hollow toroidal interiors of the members of said stack, said conduit means defining a first fluid path passing angularly and serially through said hollow toroidal interiors of the members of said stack in heat exchange relationship with the interiors of said members; top and bottom portions of said conduit means being at opposite extremes of said first fluid path,
  said conduit means intercepting each member at two said locations which are angularly spaced apart about 180 degrees, whereby said first fluid path includes two different angularly spaced apart, angularly directed fluid paths through the hollow toroidal interior of each member, each of said two angularly directed fluid paths being about 180 degrees in extent.

7. The apparatus of claim 6, wherein the members of said stack are aligned coaxially, and further comprising a heat storage medium in the center of said stack configured to define a second fluid path through the center of said stack in heat exchange relationship with said medium, and further comprising fluid path defining means respectively coupling the bottom and top ends of said medium to said bottom and top conduit means portions to define a first recirculating fluid path including the first and second fluid paths and further including impeller means in series with said fluid path defining means for driving fluid through said first recirculating fluid path, whereby heat from said members is transferred to said medium.

8. The apparatus of claim 7, further comprising a third fluid path through a space, proximate said members, to be heated and wherein said fluid path defining means includes switchable means for selectively either placing said impeller means in series with said first recirculating fluid path or for placing said impeller means in series with a second recirculating fluid path which includes said second and third fluid paths.

9. The apparatus of claim 7, wherein said fluid path defining means defines said first recirculating fluid path in a manner that over a portion of said first recirculating fluid path, fluid flows generally vertically along and in contact with the exterior of said stack for additional heat exchange.

10. The apparatus of claim 7, further comprising recirculating liquid heat exchange means in heat exchange relationship with said medium and with a space, external of said stack, to be heated.

11. The apparatus of claim 7, further comprising a thermal energy storage medium within the hollow interior of each member of said stack, said medium being configured and contained so as to enable fluid flow along said first fluid path angularly through the hollow toroidal interiors of said members.

* * * * *